Jan. 11, 1927.　　　　H. B. HARTMAN　　　　1,613,998
WATER PURIFYING APPARATUS
Filed June 21, 1923
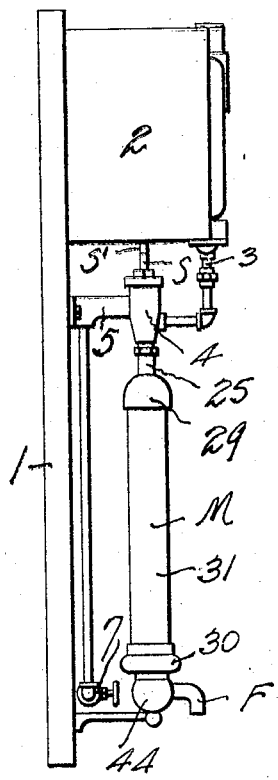
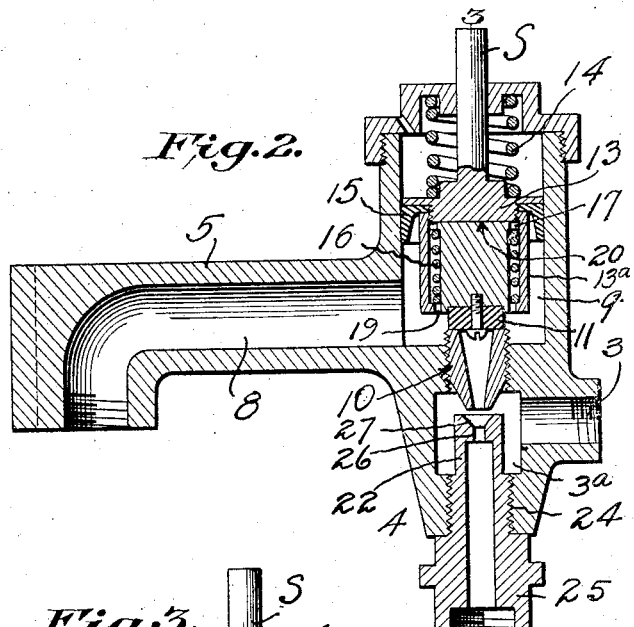
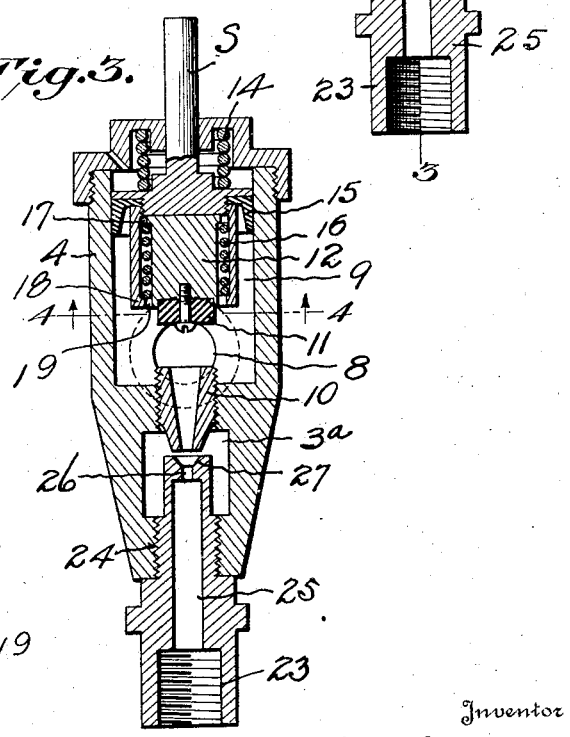
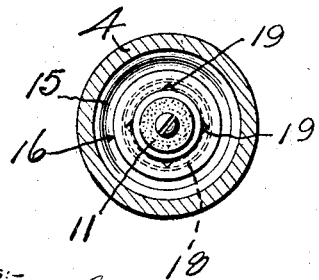
Inventor
H. B. Hartman,
By ......... Attorney
WITNESSES:

Patented Jan. 11, 1927.

1,613,998

UNITED STATES PATENT OFFICE.

HARRY BUXTON HARTMAN, OF SCOTTDALE, PENNSYLVANIA, ASSIGNOR TO ELECTRIC WATER STERILIZER AND OZONE COMPANY, OF SCOTTDALE, PENNSYLVANIA, A CORPORATION OF PENNSYLVANIA.

WATER-PURIFYING APPARATUS.

Application filed June 21, 1923. Serial No. 646,952.

This invention relates to water purifying apparatus of the type shown in my co-pending application Ser. No. 461,504, filed April 15, 1921, of which this case is a division.

A primary object of the invention is to provide a machine particularly adapted for household use or similar installations. In machines of that character it is desirable to have all of the necessary instrumentalities assembled in a convenient and compact manner so that the entire apparatus may be handled as a unit and take up as little space as possible, while at the same time having all of the advantages of automatic control and operation.

A further object of the invention is to provide an apparatus wherein the ozone generator is automatically placed in and out of operation by the act of opening and closing a valve to obtain the purified water. That is to say, the invention contemplates the combination of novel fluid pressure responsive devices and a switch which controls the circuit to the ozone generator in such a manner as to insure the operation of the generator while water is passing through the apparatus and to also compel the operation of the generator sufficiently in advance of the initial movement of water through the apparatus to provide an adequate quantity of ozone to purify the water first drawn from the valve or faucet each time that it is opened.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a side elevation of the improved apparatus.

Figure 2 is a detail sectional view of the automatic valve for starting the operation of the ozone generator upon opening of the water line, and also showing the injector device.

Figure 3 is a vertical sectional view of the automatic valve taken on the line 3—3 of Figure 2.

Figure 4 is a horizontal cross sectional view taken on the line 4—4 of Figure 3.

Similar reference characters designate corresponding parts throughout the several figures of the drawings.

The present invention may be carried into effect in various forms, but to adapt the same particularly for household installations and the like, it is preferred to utilize the general arrangement shown in the accompanying drawings, wherein it will be observed from Figure 1 that the entire apparatus may be carried upon a suitable base 1 that may be conveniently handled and placed with reference to the point of use. Also, from the figures referred to, it will be seen that the said base 1 preferably carries an ozone generator 2 having the ozone outlet connection 3 leading to an injector device 4 which may be a part of the casing of an automatic valve device 5. This valve device opens and closes an electrical circuit to the ozone generator 2 upon the opening of the water supply line 6 which leads into the said casing of the valve 5 as clearly shown in Figure 2, and is provided with a conventional turn cock or valve 7 for controlling the supply of raw or untreated water to the valve device 5. When water pressure is admitted into the casing of the valve, as will presently appear, the stem S of the said valve will operate a simple and standard form of an electrical snap switch through the stem S' to close a circuit to the generator 2 for generating ozone. As the switch is closed only when water is flowing through the valve, ozone is generated only when the machine is in use. Upon the closing of the switch by the automatic valve the ozone generator 2 immediately functions and ozone gas is readily available so that water passing through the injector device 4 will draw about an equal volume of ozone through the conduit 3 and discharge both the ozone and water into the novel mixing device M wherein the water is thoroughly ozonated and finally discharged in its purified state from the outlet or faucet F.

Referring now to the automatic valve device 5, it will be observed from Figures 2 and 3 of the drawings that when the valve 7 in the supply line is open, the raw water will flow through the pipe 6 into the valve chamber 8 which includes a plunger chamber 9. At the bottom of this chamber 9 is an injector nozzle 10 that is normally sealed by a suitable washer or gasket 11 carried by a valve or sealing head 12 mounted within and carried by a main actuating plunger 13. The said main plunger 13 carries the switch operating stem S previously referred to and may be maintained in its normal closed position by a relatively stout coil spring 14 and for the purpose of providing an effective water seal between its side edge and the side of the chamber 10, a suitable leather cup washer 15 may be used.

The said sealing head 12 which carries the washer 11 is held retracted within the hollow body 13ª of the main plunger 13 by a relatively light coil spring 16 which engages behind the annular shoulder 17 at the top of the head while its other end abuts against the inturned annular shoulder 18 at the bottom edge of the main plunger 13. The body of the said head 12 is preferably provided with openings 19 which permit the passage of water to the rear face 20 thereof to break capillary attraction between the said face and the bottom face of 13 and permit water pressure behind the head to hold the washer 11 to its seat temporarily on the injector nozzle 10 during the preliminary raising movement of the main plunger 13. When the plunger 13 elevates sufficiently to cause the spring 16 to be compressed to its limit, the water seal existing between the nozzle 10 and the plunger 11 will be broken and the spring 16 will cause the head 12 to recede into the body of the plunger 13 as shown in Figure 4, thus fully opening the line of communication between the chamber 8 and the bore of the injector nozzle 10. Also by holding the washer 11 to its seat until the plunger has nearly completed its upward stroke the switch of the ozone generator is thrown to its closed position to start the ozone generating action slightly in advance of the passage of water through the injector nozzle 10 to thereby insure a supply of ozone for simultaneously mixing with the water as it passes through the injector.

When the parts are in the position shown in Fig. 2 and water under pressure is admitted to the chamber 8, the first effect of the water pressure will be to exert a closing tendency on the washer 11 and at the same time enter the openings 19 so that the pressure within the hollow body 13ª of the plunger will be the same as that exerted on the cup-washer 15 and serve to break the capillary attraction between the bottom of 13 and surface 20 of sealing head 12. When the water pressure against the plunger becomes great enough to overcome the pressure of the spring 14, the plunger will rise but the sealing head 12 will remain seated until the plunger has traveled far enough to compress the spring 16 whereupon the washer 11 will be lifted from the nozzle 10 and the spring 16 will move the sealing head upwardly until the surface 20 contacts with the inside bottom wall of the plunger 13. In that way the plunger 13 has an initial movement of sufficient length to cause the stem S to operate the switch thereby to start the generation of ozone prior to the rush of raw water through the nozzle 10.

Water discharged from the nozzle 10 of the injector device 4 draws ozone from the ozone generator through the conduit 3 and into the ozone collecting chamber 3ª which surrounds the intake nozzle of an injector plug 23 which may be detachably fitted to the body of the valve casing as indicated at 24. This plug is provided with the hollow interior bore 25 which communicates through the jet orifice 26 with the substantially conical receiving well 27 arranged at the discharge end of the nozzle 10 to receive the discharge of water therefrom. Obviously, the rapid discharge of water from the nozzle into the well 27 will cause the ozone to be sucked from the chamber 3ª through the orifice 26 and into the bore 25 along with the water, which passes into the central pipe 28 that constitutes the receiving conduit of the mixing device M.

After the water and ozone pass through the mixing device M, they may be drawn off through the faucet F, as previously indicated.

From the foregoing it will be apparent that the present invention provides an ozone water purifying apparatus which includes a switch part on the generator, together with a combined valve and injector device comprising a plunger valve for controlling the injector and having means for operating the switch part on the generator in advance of unseating the valve from the inlet end of the injector device.

Without further description it is thought that the many features and advantages of the invention will be readily apparent, and it will of course be understood that changes in the form, proportion and minor details of construction may be resorted to without departing from the spirit of the invention or scope of the appended claims.

I claim:

1. A water purifying apparatus including in combination, an ozone generator, a switch part on the generator, a combined valve and injector device including a casing, an injector nozzle therein, a plunger operating in part of said casing, a spring for the plunger adapted to be overcome by water pressure within the casing, a valve within the plunger and adapted to normally seat on the nozzle, a coiled spring constituting a yielding coupling between the valve and the plunger, and a stem on the plunger for engaging with the switch part on the generator.

2. A water purifying apparatus including in combination, an ozone generator, a switch part on the generator, a combined valve and injector device including an injector nozzle, a valve normally covering the inlet end of said nozzle, a plunger carrying the valve within the same, and means in the plunger for permitting water pressure to move the plunger before the valve to operate the switch part on the generator before the valve is removed from the inlet end of said nozzle.

3. A water purifying apparatus including in combination, an ozone generator, a switch part on the generator, a combined valve and injector unit including an injector nozzle, said unit also including a valve head adapted to seat on said nozzle, and a plunger consisting of two parts one of which carries therein the valve head and the other of which carries a projection for operating the switch part on the generator, and means in the part of the plunger carrying the valve for permitting water pressure to separate the plunger and valve to cause the plunger to operate the switch part before moving the head of the valve from the inlet side of the nozzle.

4. A water purifying apparatus including in combination, an ozone generator having a switch part thereon, a combined valve and injector unit arranged in close proximity to the generator and an ozone pipe from the generator communicating with the injector portion of said combined valve and injector unit, a water pipe line communicating with the valve portion of said combined valve and injector unit, and a spring-pressed plunger acting against the flow of the liquid arranged within said unit and consisting of a plunger head and a valve head yieldingly connected, said valve head normally closing a water valve outlet orifice in said unit, and openings in the plunger whereby water pressure in said water pipe connection will first overcome the spring pressure on the plunger head to cause the plunger to actuate the switch part on the generator and then unseat the valve head to permit water to pass into the injector portion of the device.

5. A water purifying apparatus including in combination, an ozone generator, a switch part on the generator for controlling the electrical current for the generation of ozone, and a combined water valve and ozone injector device supported in relatively close proximity to the ozone generator, a relatively short pipe connection between the ozone generator and the posterior side of the water valve, and a spring-pressed plunger associated with said water valve and having an exteriorly operating stem portion adapted to engage with the switch part projecting from the ozone generator, said plunger being responsive to water pressure on the anterior side of the water valve and operating prior to the unseating of the water valve.

6. A water purifying apparatus including in combination, an ozone generator, a switch part on the generator, a combined ejector unit and valve device supported in relatively close proximity to the ozone generator and including a water pipe line, an interior injector nozzle, a relatively short ozone pipe line establishing communication between the ozone generator and the discharge side of the injector nozzle, and a combined plunger and valve unit responsive to water pressure in the water pipe line and including a valve head normally seated on the inlet side of the injector nozzle and a plunger yieldingly coupled with said valve head and having openings to permit water pressure to act on the valve head whereby relative initial movement of the plunger may take place prior to the unseating of the valve head from the injector nozzle, and an exteriorly projecting stem portion carried by the plunger and adapted to engage the switch part on the generator.

In testimony whereof I hereunto affix my signature.

HARRY BUXTON HARTMAN.